May 10, 1966 B. McDERMOTT ETAL 3,250,858
SUBSCRIBER LINE DIVIDED ACCESS CIRCUIT
Filed Oct. 11, 1961
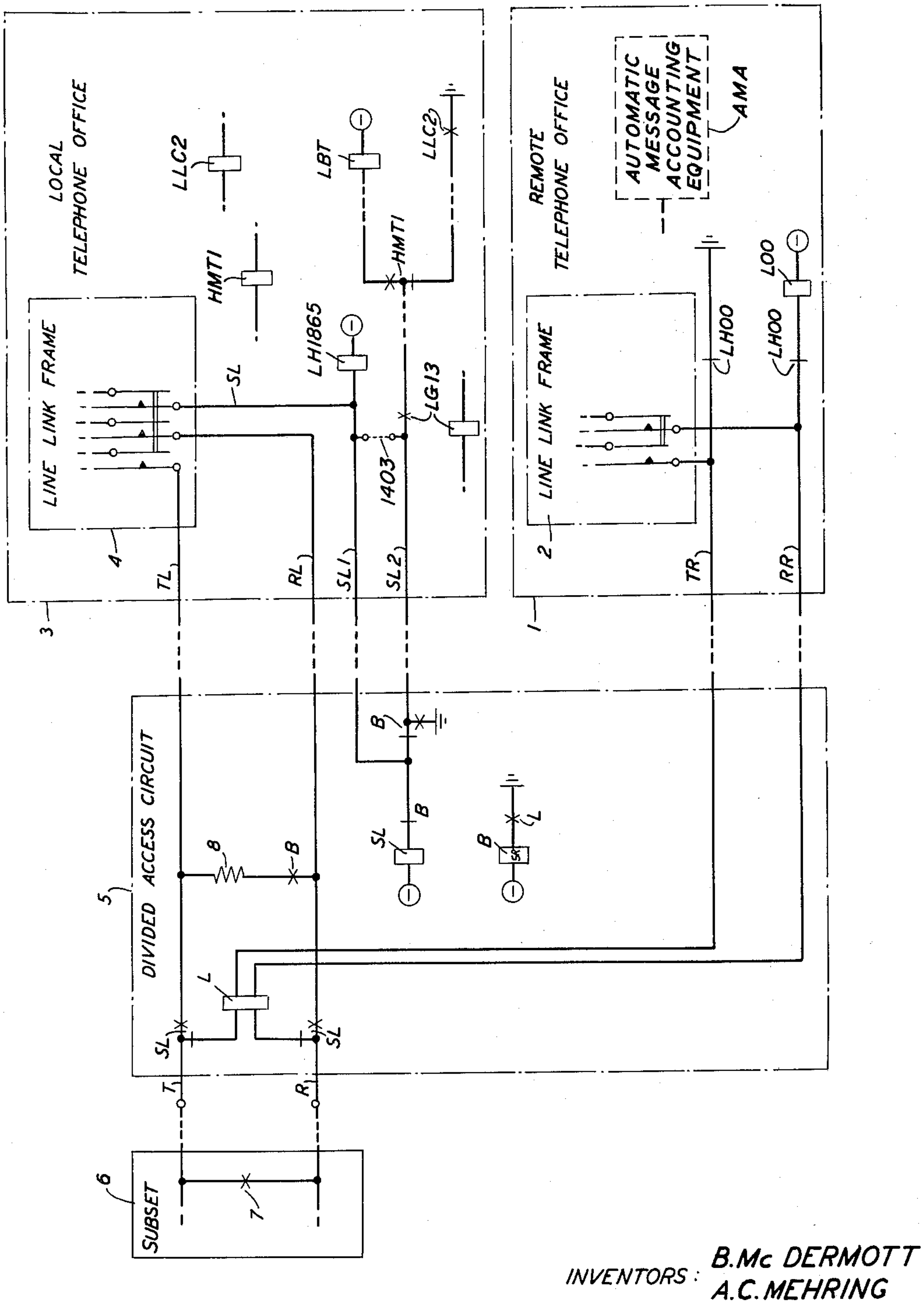
INVENTORS: B.Mc DERMOTT
A.C.MEHRING
BY
ATTORNEY United States Patent Office 3,250,858

Patented May 10, 1966

3,250,858

SUBSCRIBER LINE DIVIDED ACCESS CIRCUIT

Byron McDermott, Chatham Township, Morris County, and Arthur C. Mehring, Summit, N.J., assignor to Bell Telephone Laboratories, Incorporated, New York, N.Y., a corporation of New York Filed Oct. 11, 1961, Ser. No. 144,333
4 Claims. (Cl. 179—18)

This invention relates to communications systems and, more particularly, to a control circuit which provides access from a subscriber line to a plurality of transmission lines.

A broad object of this invention is to extend a subscriber line to a first or second transmission line.

In the copending application of T. L. Doktor, G. Parker, L. A. Weber and H. M. Zydney, Serial No. 141,672, filed September 29, 1961, now Patent No. 3,113,176,, there is disclosed a subscriber data transmission set for transmitting and receiving voice frequency data signals over the telephone switching network. The subscriber set is provided with a telephone switch hook, dial and ringer whereby the subscriber line may be extended to a subscriber line circuit at a telephone switching office and calls may be made in the same manner as conventional telephone subscriber calls. It is desirable that various items of information relating to each call originated by the data set subscriber be recorded at the telephone office to compute customer charges. Message accounting facilities are relatively expensive, however, and are therefore not provided at all telephone switching offices. Accordingly, in the event that the local telephone office does not provide message accounting facilities, calls by the data set subscriber may advantageously originate through a remote office provided with the message accounting equipment, while calls to the subscriber may advantageously terminate through the local office in the conventional manner.

It is an object of this invention to originate calls from a subscriber through a first telephone central office and terminate calls to the subscriber through a second telephone switching office.

It is a feature of this invention to originate a subscriber call by extending the subscriber line to the subscriber line circuit at a remote telephone office and terminate a subscriber call by switching the subscriber line to the subscriber line circuit at a local telephone office.

It is another feature of this invention to signal the local telephone office that the subscriber line is in a busy condition when the subscriber originates a call through the remote telephone office.

It is an additional feature of this invention to preclude the routing of a call to the subscriber through the local office when the subscriber line is busy due to a call originating through the remote office.

The means for fulfilling the foregoing objects and the practical embodiments of the features of this invention will be fully understood from the following description taken in conjunction with the accompanying drawing, the single figure of which illustrates in block diagram form the remote telephone office, the local telephone office, a subscriber's subset, and schematically the manner in accordance with the present invention in which calls at the subscriber's subset are received from the local office and originated through the remote office.

In the drawing, the relay contacts are shown detached from the relay windings. Contacts which are closed when the associated relay is de-energized, known as break contacts, are represented by a single short line perpendicular to the conductor line, while contacts which are closed when the relay is energized, known as make contacts, are represented by two short cross lines diagonally intersecting the conductor line.

Referring now to the drawing, block 1 generally indicates a remote telephone office. Advantageously, the remote telephone office may be of the crossbar type well known in the art and a suitable arrangement is shown, for example, in Patent 2,585,904 of A. J. Busch, granted February 19, 1952, and in Patent 2,599,358 of H. D. Cahill, et al., granted June 3, 1952. As indicated hereinbefore, the remote telephone office is equipped with automatic message accounting equipment, designated AMA in the drawing, in the manner disclosed in the Cahill et al. patent. As disclosed in FIG. 5 of the above-identified Busch patent, the tip and ring of a subscriber line extends to a line link frame, generally indicated by block 2 in the present disclosure. In addition, the tip lead extends to ground by way of the break contacts of relay LH00 and the ring lead extends to battery by way of break contacts of relay LH00 and the winding of line relay L00, which relays are similarly designated in the present application. In accordance with the disclosure in the above-identified Busch patent, the subscriber initiates a call by raising his handset to close the switch hook contacts, completing a short across the tip and ring leads. This completes an operating path for relay L00 and the telephone office proceeds to select a marker, which, in turn, seizes a register. The seized register operates the select magnet and hold magnet individual to the subscriber line circuit whereupon the tip and ring are extended through the line link frame, and dial tone is returned to the subscriber. The subscriber thereupon dials the desired station and the call proceeds in a manner well known in the art.

Block 3 generally indicates the local telephone crossbar office which can be considered substantially identical to the telephone office indicated by block 1 except that it is not provided with automatic message accounting equipment. Local telephone office 3 includes line link frame 4, the tip and ring leads of a subscriber line and a sleeve lead, all of the leads extending from line link frame 4. The sleeve lead, designated lead SL in the present disclosure, extends to the winding of hold magnet LH1865 which is similarly designated in FIG. 13 of the above-identified Busch patent. In addition, lead 1403 extends from the winding of relay LH1865 through the make contacts of relay LG13, similarly designated in FIG. 14 in the Busch patent, and then to either negative battery by way of the make contacts of relay HMT1, similarly designated in FIG. 109 in the Busch patent, and the winding of busy test relay LBT, similarly designated in FIG. 90 in the Busch patent, or to ground by way of the break contacts of relay HMT1 and the make contacts of relay LLC2, similarly designated in FIG. 96 of the Busch patent. As disclosed in detail in the Busch patent, during the process to connect a marker to the called line, relays HMT1 and LG13 operate to extend the sleeve lead at the winding of relay LH1865 to the winding of busy test relay LBT. In the event that the subscriber line is busy, ground is applied by way of line link frame 4 to the sleeve lead whereby relay LBT operates and initiates the sequence to return a busy signal to the calling subscriber. In the event that the line is not busy, relay LBT does not operate, and, as disclosed in detail in the above-identified Busch patent, the select magnet individual to the subscriber line is operated together with the release of relay HMT1 and the operation of relay LLC2. This extends ground by way of the make contacts of relay LLC2, the break contacts of relay HMT1, the make contacts of relay LG13 and lead 1403 to the winding of hold magnet LH1865. The above sequence of operation extends the tip and ring of the subscriber line through line link frame 4, whereupon ringing is applied to the subscriber line and the call is extended to the subscriber. In addition, the sleeve lead is extended through the line link frame to ground and hold magnet LH00 is maintained energized.

In accordance with the present invention, tip lead TR and ring lead RR are extended from remote office 1 to the divided access circuit generally indicated by block 5. Tip lead TL and ring lead RL at local telephone office 3 are also extended to divided access circuit 5. In addition, in accordance with the present invention, lead 1403 which, as previously described, extends between the winding of hold magnet LH1865 and make contacts LG13, is removed. Sleeve lead SL1 is connected from the winding of hold magnet LH1865 to divided access circuit 5 and sleeve lead SL2 is connected from make contacts LG13 to divided access circuit 5.

Considering now divided access circuit 5, ring lead RR extends by way of a winding of line relay L, and break contacts of relay SL to ring lead R of subscriber subset 6, which subset may be of the type disclosed in the above-identified Doktor et al. application. Tip lead TR extends through divided access circuit 5 by way of a winding of relay L and break contacts of relay SL to tip lead T of subscriber subset 6. Ring lead RL, which extends from local office 3 to divided access circuit 5, is connected to ring lead R of subset 6 by way of make contacts of relay SL, and tip lead TL extends to tip lead T of subset 6 by way of make contacts of relay SL. Sleeve lead SL1 is connected to sleeve lead SL2 by way of break contacts of relay B in divided access circuit 5. In addition, sleeve lead SL1 extends to the winding of relay SL by way of break contacts of relay B and sleeve lead SL2 extends to ground by way of make contacts of delay B.

Assuming now that the subscriber operates switch hook 7 to originate a call, a path is completed from ground by way of break contacts of relay LH00 in remote office 1, tip lead TR, a winding of relay L, break contacts of relay SL, tip lead T of subset 6, switch hook contacts 7, ring lead R, break contacts of relay SL, a winding of relay L, ring lead RR, and in remote office 1 through break contacts of relay LH00 and the winding of relay L00 to negative battery operating relay L00 and relay L. Relay L00 operated initiates the call through remote office 1 as previously described.

The operation of relay L completes an obvious operating path for slow-to-release relay B. Relay B operated opens the previously described connection between sleeve lead SL1 and sleeve lead SL2 and disconnects sleeve lead SL1 from the winding of relay SL by way of the break contacts of relay B. In addition, relay B operated extends ground to lead SL2 and completes a suitable idle line termination across leads TL and RL by way of resistor 8.

The call may be terminated by the opening of switch hook contacts 7, for example, opening the previously described energizing path for relay L. Relay L released opens the operating path for relay B. When relay B releases, the divided access circuit 5 is restored to the initial condition.

Assuming now that a call to subset 6 is being terminated through local office 3, relays LG13 and HMT1 thereat are operated as previously described extending the winding of busy test relay LBT through the contacts of relays HMT1 and LG13 to sleeve lead SL2. If the subscriber is not busy, lead SL2 is further extended by way of the break contacts of relay B and lead SL1 to lead SL. Since, in the idle condition, there is no ground presented to lead SL by way of the crosspoints of line link frame 4, relay LBT does not operate whereupon relay HMT1 releases and relay LLC2 operates. The operation of relay LLC2 extends ground by way of its make contacts, the break contacts of relay HMT1, the make contacts of relay LG13, sleeve lead SL2, the break contacts of relay B and sleeve lead SL1 to the winding of hold magnet LH1865. In addition, the ground applied by way of sleeve lead SL2 is extended through the break contacts of relay B to the winding of relay SL operating the relay.

Relay SL operated opens the previously described connection extending tip lead T and ring lead R to tip lead TR and ring lead RR, respectively, by way of the winding of relay L and connects tip lead T and ring lead R to tip lead TL and ring lead RL by way of the make contacts of relay SL. As previously described, the energization of hold magnet LH1865 extends leads TL and RL through line link frame 4. In addition, ground is applied through line link frame 4 to sleeve lead SL and maintains hold magnet LH1865 energized. The ground on lead SL is also extended through lead SL1 and the break contacts of relay B to the winding of relay SL, maintaining relay SL operated. In addition, the ground on lead SL1 is applied to lead SL2 by way of the break contacts of relay B. Accordingly, a subsequent call to the subscriber applies the ground on lead SL2 to the winding of relay LBT indicating the busy condition of the subscriber line.

At the termination of the call, ground on lead SL is removed, de-energized hold magnet LH1865 and releasing relay SL. The release of relay SL reconnects the subscriber line to remote telephone office 1 and the de-energization of relay LH1865 provides, in part, the process to restore telephone office 3 to the initial idle condition as described in detail in the above-identified Busch patent.

In the event that the subscriber initiated a call through remote office 1, prior to the call being terminated through local office 3, relays L and B are operated as previously described, applying ground to lead SL2 by way of make contacts of relay B. Accordingly, when the subscriber is called through telephone office 3, relays LG13 and HMT1 operate and the ground on lead SL2 is extended to the winding of busy test relay LBT. Relay LBT thus operates to initiate the busy sequence. In addition, with relay B operated, ground cannot be applied to the winding of relay SL or the winding of hold magnet LH1865 by way of the make contacts of relay LLC2. Accordingly, local telephone office 3 cannot terminate a call to the subscriber until the subscriber line is returned to the idle condition.

Although a specific embodiment of the invention has been shown and described, it will be understood that various modifications may be made without departing from the spirit of this invention and within the scope of the appended claims.

What is claimed is:

1. A subscriber line divided access circuit for originating a call through a first switching office and terminating a call from a second switching office, said second switching office including a link circuit and a busy test circuit, said access circuit comprising, a first transmission line connecting said subscriber line to said first office, a second transmission line extending to said second office link circuit, means for normally connecting said busy test circuit to said link circuit, monitoring means connected to said first transmission line and responsive to an originating call from said subscriber line for disconnecting said busy test circuit and said link circuit means independent of said link circuit and responsive to said monitoring means for energizing said busy test circuit, and means responsive to a terminating call from said second office for transferring said subscriber line connection from said first transmission line to said second transmission line.

2. A subscriber line divided access circuit for originating a call through a first switching office and terminating a call from a second switching office, said second switching office including a link circuit, a link enabling circuit and a busy test circuit, said divided access circuit comprising, a first transmission line extending to said first switching office, a second transmission line extending to said second office link circuit, means for normally connecting said subscriber line to said first transmission line, a first sleeve lead extending to said link circuit, a second sleeve lead interconnecting said link enabling circuit and said busy test circuit with said first sleeve lead, means connected to said first sleeve lead and responsive to said link enabling circuit for transferring said subscriber line from said first transmission line to said second transmission line, and means connected to said first transmission line and responsive to an originating call from said subscriber line for disconnecting said second sleeve lead from said first sleeve lead and applying a busy signal to said second sleeve lead.

3. A divided access circuit for extending a subscriber line to a first or second switching office, said second switching office including means for effecting an intra-office connection and means for testing said intra-office connection, said access circuit comprising a first transmission line extending to said first office, a second transmission line extending to said second office effecting means, means for normally connecting said subscriber line to said first transmission line, means responsive to said effecting means for transferring said subscriber line connection from said first transmission line to said second transmission line, monitoring means connected to said first transmission line and responsive to a call from said subscriber line for disabling said effecting means, and means independent of said effecting means and responsive to said monitoring means for energizing said testing means.

4. A divided access circuit for extending a subscriber line to a first or second central switching office, said second switching office including means for effecting an intra-office connection, means for enabling said effecting means and means for testing said intra-office connection, said access circuit comprising, a first transmission line extending to said first office, a second transmission line extending to said second office effecting means, means for normally connecting said subscriber line to said first transmission line, means for connecting said enabling means to said effecting means, means responsive to said enabling means for transferring said subscriber line connection from said first transmission line to said second transmission line, monitoring mean connected to said first transmission line and responsive to a call from said subscriber line for disabling said transferring means and disconnecting said enabling means and said effecting means, and means independent of said effecting means and responsive to said monitoring means for energizing said testing means.

References Cited by the Examiner

UNITED STATES PATENTS

| | | | |
|---|---|---|---|
| 1,455,951 | 5/1923 | Willis | 179—27 |
| 1,578,651 | 3/1926 | Fetzer | 179—49 |
| 1,776,570 | 9/1930 | Ruggles | 179—27 |
| 2,338,997 | 1/1944 | Busch et al. | 179—27 |
| 2,981,930 | 4/1961 | Staples | 340—163 |

ROBERT H. ROSE, *Primary Examiner.*

NEIL C. READ, WALTER L. LYNDE, *Examiners.*

L. A. HOFFMAN, *Assistant Examiner.*